W. WIGSTON.
APPARATUS FOR PURIFYING GAS.

No. 9,981. Patented Aug. 30, 1853.

UNITED STATES PATENT OFFICE.

WILLIAM WIGSTON, OF NEW YORK, N. Y.

APPARATUS FOR PURIFYING GAS.

Specification of Letters Patent No. 9,981, dated August 30, 1853.

*To all whom it may concern:*

Be it known that I, WILLIAM WIGSTON, of the city, county, and State of New York, have invented a new and useful Improvement in Apparatus for Purifying Gas; and I do hereby declare that the following is a full, clear, and exact description of the same, reference being had to the accompanying drawings, forming part of this specification, in which—

Figure 1:
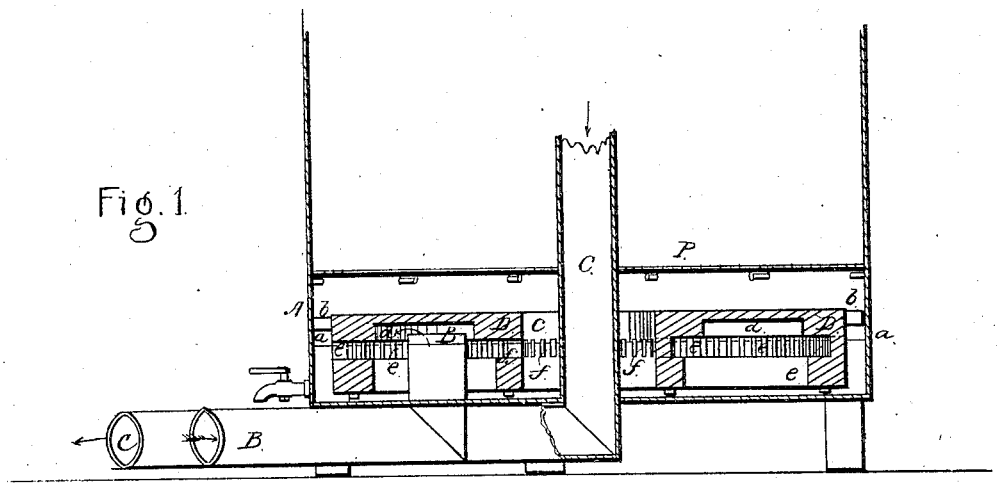
Figure 2:
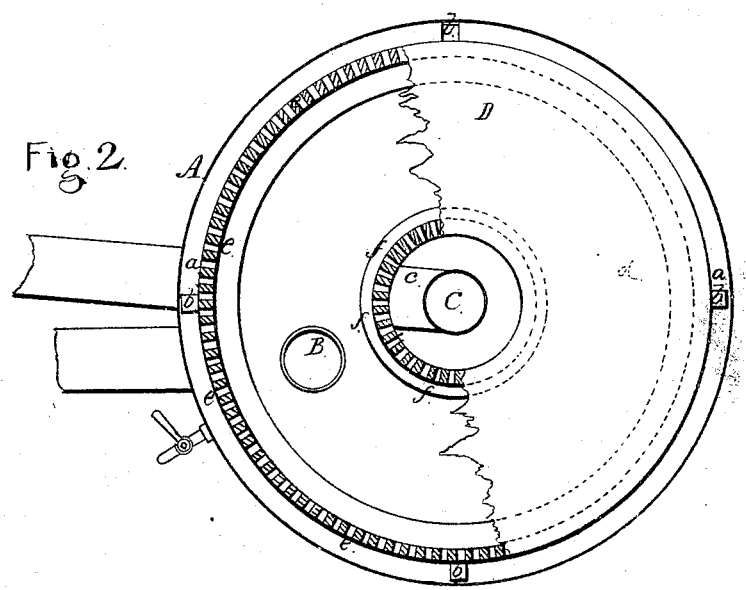

Figure 1, is a vertical section through the center of a purifier containing my improvements. Fig. 2, is a plan of the same, partly in section.

Similar letters of reference indicate corresponding parts in both figures.

This invention relates to the purification of gas by passing it over the surface of a liquid, and is principally intended to be employed in the extraction of the sulfurous impurities by washing in ammonical liquor, either at the bottom of the dry lime purifier or in a different vessel.

It has for its object the distribution of the gas in thin streams over the surface of the liquor.

The nature of the invention consists in what I term a "scrubber," which is a float of wood or other material of circular or other form, of sufficient buoyancy to float in the purifying liquor, with an interior cavity above the surface of the liquor, and with passages leading from the said cavity through its sides. The gas enters through the inlet pipe, which rises through the liquor and opens into the cavity above its surface, escaping through the passages through the sides. These passages are so arranged that they are almost or entirely submerged when there is no pressure of gas, but that when there is a pressure the float will be raised, so as to bring a small portion above the surface, to allow the escape of the gas in very thin streams, and thereby bring every portion of it into contact with the liquor.

To enable those skilled in the art to make and use my invention, I will proceed to describe its construction and operation.

A, is the lower part of a dry lime purifier, in which the purifying liquor is represented in blue color at the bottom.

P, is the lowest of the series of perforated plates on which the dry lime is spread.

B, is the inlet pipe, whose mouth rises a little above the surface of the liquor.

C, is the outlet pipe, which is supposed to return downward from the upper part of the dry lime purifier and pass out through the bottom.

D, is the "scrubber," which is represented as being made of wood—that being, as I consider, the best material on account of economy. It is circular externally, or of the same form as the purifier, and of such size as to leave a narrow space, $a$, between it and the sides of the purifier, in which it is kept in place by projecting pieces, $b$, on the sides of either. There is an opening, $c$, in the center, which makes it of annular form. Its depth is sufficient to keep it floating with a considerable portion submerged and to leave the cavity, $d$, which extends all around its interior, above the surface of the liquor. The cavity, $d$, does not require to be of very great capacity. At the bottom of the cavity, $d$, are a series of openings or passages, $e$, $e$, leading from the said cavity, through the "scrubber," to its outside, and another series, $f$, $f$, leading to the opening, $c$. Of these passages, there may be any number, disposed in such a way as to obtain the greatest possible amount of horizontal area of opening. The gas entering the cavity, $d$, from the inlet pipe raises the "scrubber," to bring a small portion of every opening, $e$, and, $f$, above the surface of the liquor, and escapes in a number of very thinly spread streams over the surface of the liquor upon which it is washed or scrubbed, after which it passes up through the series of plates, P, to the top of the dry lime purifier or to some other conduit or receptacle. The operation of the "scrubber" is not influenced by the quantity of fluid in the vessel, A, but will be perfect while there is liquor enough to float it.

What I claim as my invention, and desire to secure by Letters-Patent, is,

Constructing the scrubber or float D, with a cavity, $d$, to receive the gas above the surface of the fluid, and partly submerged passages $e$, $e$, $f$, $f$, leading from the said cavity through the sides of the float to allow the escape of the gas from the cavity and cause its distribution over the surface of the fluid in thin streams to produce a diffused contact with the fluid, as described.

WM. WIGSTON.

Witnesses:
E. C. POLHAMUS,
S. H. WALES.